United States Patent [19]

Carlson et al.

[11] Patent Number: 4,809,220

[45] Date of Patent: Feb. 28, 1989

[54] ELECTRONIC PROCESSING SYSTEM USING PRINTER AND MICROPROCESSOR TO CREATE FORMS TEMPLATE WITH PRE-PRINTED FORMS

[75] Inventors: Kenneth A. Carlson, Sterling; John F. LeBrun, Lowell, Mass.; Salvatore Giacomazzo, Stow; Jonathan D. Saperia, East Pepperell, all of Mass.

[73] Assignee: Wang Laboratories, Inc., Lowell, Mass.

[21] Appl. No.: 29,359

[22] Filed: Mar. 23, 1987

Related U.S. Application Data

[63] Continuation of Ser. No. 595,079, Mar. 30, 1984, abandoned.

[51] Int. Cl.$^4$ .......................... G06F 3/12; G06F 15/00
[52] U.S. Cl. ........................................ 364/900; 400/63
[58] Field of Search ... 364/200 MS File, 900 MS File; 400/63

[56] References Cited

U.S. PATENT DOCUMENTS

| | | | |
|---|---|---|---|
| 3,610,902 | 10/1971 | Rahenkamp | 364/406 X |
| 3,872,462 | 3/1975 | Lemelson | 360/32 X |
| 3,971,000 | 7/1976 | Cromwell | 364/200 |
| 3,974,493 | 8/1976 | de Cavaignac | 364/900 X |
| 4,101,959 | 7/1978 | Domilce | 364/200 |
| 4,403,301 | 9/1983 | Fessel | 364/900 |
| 4,404,649 | 9/1983 | Nunley et al. | 364/900 |
| 4,454,576 | 6/1984 | McInroy et al. | 364/200 |
| 4,497,589 | 2/1985 | Figini | 400/706 |
| 4,503,499 | 3/1985 | Mason | 364/200 |
| 4,542,378 | 7/1985 | Suganuma et al. | 340/734 |
| 4,553,206 | 11/1985 | Smutek et al. | 364/300 |
| 4,649,513 | 3/1987 | Martin et al. | 364/900 |
| 4,658,366 | 4/1987 | Posh | 364/200 |
| 4,677,585 | 6/1987 | Ikegami et al. | 364/900 |

FOREIGN PATENT DOCUMENTS 0067303  12/1982  European Pat. Off. .

OTHER PUBLICATIONS

D. A. Kightlinger, *Display-Assisted Forms Completion*, IBM Technical Bulletin, (vol. 24, No. 12, May 1982), pp. 6543–6644.

G. W. Hobgood, Jr., *CRT Projected Image for Forms Fill-In In Text Processing*, IBM Tech. Discl. Bull. (vol. 24, No. 1A, Jun. 1981), p. 386.

R. E. Croes et al, *Tab Alignment with Preprinted Forms*, IBM Tech. Discl. Bull., (vol. 26, No. 3B, Aug. 1983), p. 1424.

J. W. Dwire, *Form Processing on a Character Generator Displaywriter Having No Overstrike Capabilities*, IBM T.D.B., (vol. 26, No. 4, Sep. 1983), pp. 1775–1776.

P. J. Christenson et al., *Form Documents for a Text Editing Application*, IBM Tech. Discl. Bull., (vol. 26, No. 5, Oct. 1983), pp. 2490–2493.

(List continued on next page.)

*Primary Examiner*—Raulfe B. Zache
*Assistant Examiner*—Thomas C. Lee
*Attorney, Agent, or Firm*—Michael H. Shanahan; Scott K. Peterson

[57] ABSTRACT

A method and apparatus for operating with pre-printed forms on electronic office processing equipment by using a printer under control of a video terminal keyboard to identify the location and length of blanks on a pre-printed form and then displaying lines on the video display having the same length and relative position as on the form. Editing functions are used to add captions adjacent to the lines to indicate what information is to be entered on each blank line in the corresponding form. The displayed lines and captions are a form template for the particular pre-printed form and is stored. When the processing equipment is to be used to enter data for the pre-printed form, the associated form template is displayed on the video display and the appropriate information is entered onto the blank lines and then stored. When there is need for a hard copy, a pre-printed form is placed in the printer and the stored information is typed into the blanks. The system locates the blanks to fill them in using the location and length information stored when creating the form template. Features are the ability to delete and edit information entered and stored using the form template, and to merge print some or all the stored information into a form document other than the pre-printed form.

15 Claims, 7 Drawing Sheets

OTHER PUBLICATIONS

S. F. Swift, Data Processor Setup Through An Operator Interactive Remote Display, IBM Tech. Discl. Bull., (vol. 26, No. 6, Nov. 1983), pp. 3073–3074.

A. K. Cook et al., *Form Log and Printing*, IBM Technical Disclosure Bulletin, (vol. 18, No. 11, Apr. 1976), p. 3552.

J. S. Coenen et al., *Interactive Forms Positioning with Delayed Print*, IBM Tech. Disclos. Bull., (vol. 19, No. 8, Jan. 1977), p. 2821.

R. J. Gerlach et al., *System For Simplified Form Fill–In Using CRT Display*, IBM Tech. Discl. Bull., (vol. 21, No. 11, Apr. 1979), pp. 4323–4329.

J. W. Rice et al., Word Processing Terminal with Dual Display, IBM Tech. Disclos. Bull., (vol. 22, No. 9, Feb. 1980), pp. 3917–3918.

FORMS

Please Select Activity:

- Create New Form
- Enter Information
- Print Completed Form
- Change Information
- Forms Utilities Please Enter Form Name: _____

FIGURE 4

FORMS PRINTING

Form Name: _____

Form Selection:

___ All Forms
___ Select Forms

Paper Usage:

___ Front Paper Bin
___ Rear Paper Bin

FIGURE 5

FORMS UTILITIES

- Create Variable Merge Print Document
- Copy Form Template
- Delete Form Information

COPY FORM TEMPLATE

Form Name: _____
New Form Name: _____

DELETE FORM INFORMATION

Form Name: _____

Form Selection:

___ All Forms
___ Select Forms

FIGURE 8

CREATE VARIABLE MERGE PRINT DOCUMENT

Form Name:

Variable Document:

Form Selection:
- All Forms
- Select Form(s)

FIGURE 9

ELECTRONIC PROCESSING SYSTEM USING PRINTER AND MICROPROCESSOR TO CREATE FORMS TEMPLATE WITH PRE-PRINTED FORMS

This is a continuation of co-pending application Ser. No. 595,079 filed on Mar. 30, 1984, now abandoned.

BACKGROUND OF THE INVENTION

This invention relates to electronic office processing equipment and more particularly to apparatus and a method for entering information into such equipment and later printing it out on a pre-printed form.

What is disclosed is apparatus and a method for quickly and easily adapting electronic office processing equipment to create, enter, edit and store information on templates for pre-printed business forms, and later have the information printed on the forms in specific blank spaces.

In the prior art the use of electronic office processing equipment to automate data entry tasks is well known. In one mode of operation a standard business form is entered into the equipment with blanks on the form to be filled in identified in a special way. In operation a user, such as an insurance claims processor, calls up an appropriate standard form to be displayed on a video display and uses a keyboard to enter appropriate information into the blanks of the form displayed on the screen. After the form is filled in, a key operation by user causes only the data that has been entered into the blanks to be stored. In this manner, the form itself is not stored a multiplicity of times. When it is desired to print outputs of the standard form, filled in which earlier entered and stored data, a special print function is used to print the form with the blanks filled in with a set of previously entered data.

One shortcoming with the above described prior art forms technique is that a form must be typed into the system via the keyboard in order to implement the forms mode. This is impossible for forms that have other than alpha numeric characters thereon.

SUMMARY OF THE INVENTION

In accordance with the teaching of the present invention, we teach apparatus and a method for implementing a forms mode in an electronic office processor used in an office environment. The electronic processor has a video terminal a keyboard, a microprocessor whether located in the terminal or in a separate box, memory, and a daisy wheel printer. The user of our system first selects our novel forms mode as the mode of operation. A pre-printed form with anything printed thereon is placed in the daisy wheel printer and the print head thereof, operating under control of the microprocessor, is moved using cursor keys on the key board. Using the print head moved with cursor keys, the user locates the position of, and the beginning and end of each space on the pre-printed form in which information is to be entered via the keyboard to complete the form. At the same time as the print head and platen of the printer are being moved to place the print head at the beginning and end of each such space, lines are drawn on the video display of the same length as the blank spaces on the form, and in the same relative position to each other on the display as on the form in the printer. This is the beginning of a form template which is then edited to give it a title and to put brief information adjacent to each line on the display to indicate what information should be entered thereat. The end result is a form template on the display which is then stored in the memory which is part of the electronic office processor. The actual pre-printed form is never actually entered and stored in the system memory.

Thereafter, when it is desired to enter information into a particular form, the appropriate form template is read out of the system memory and displayed on the screen. The user enters the appropriate information onto the lines of the template, prompted by the captions adjacent to each line, and when finished the user operates a key which causes the newly entered information to be stored in the memory.

At a later time it may be desired to generate completed forms with any blanks thereon filled in with the aforementioned entered and stored information. The particular stored information to be printed on the forms is selected and the daisy wheel printer is loaded with a supply of the pre-printed forms either by an automatic sheet feeder, or by an endless type supply where the forms are attached end to end but are perforated for later separation. The forms may also be manually fed into the printer by the user. The selected information is printed in the appropriate blanks on the pre-printed forms to produce completed forms.

BRIEF DESCRIPTION OF THE DRAWINGS

Our invention will be better understood on reading the following detailed description in conjunction with the drawing in which:

FIG. 2 is a presentation of a pre-printed form on which are blanks to be filled in;

FIG. 4 is the first menu appearing on the display screen when the forms creation mode is called;

FIG. 5 is the forms printing menu appearing on the display screen when pre-printed forms are to be automatically filled in with previously entered and stored information;

FIG. 6 is the utilities menu appearing on the display screen identifying miscellaneous operations with our novel forms mode;

FIG. 7 is a sub-menu appearing on the display screen following a selection on the utilities menu;

FIG. 8 is a another sub-menu appearing on the display screen following a selection on the utilities menu;

FIG. 9 is a sub-menu appearing on the display screen following a selection on the forms printing menu;

DESCRIPTION OF THE PREFERRED EMBODIMENT

Figure 1:
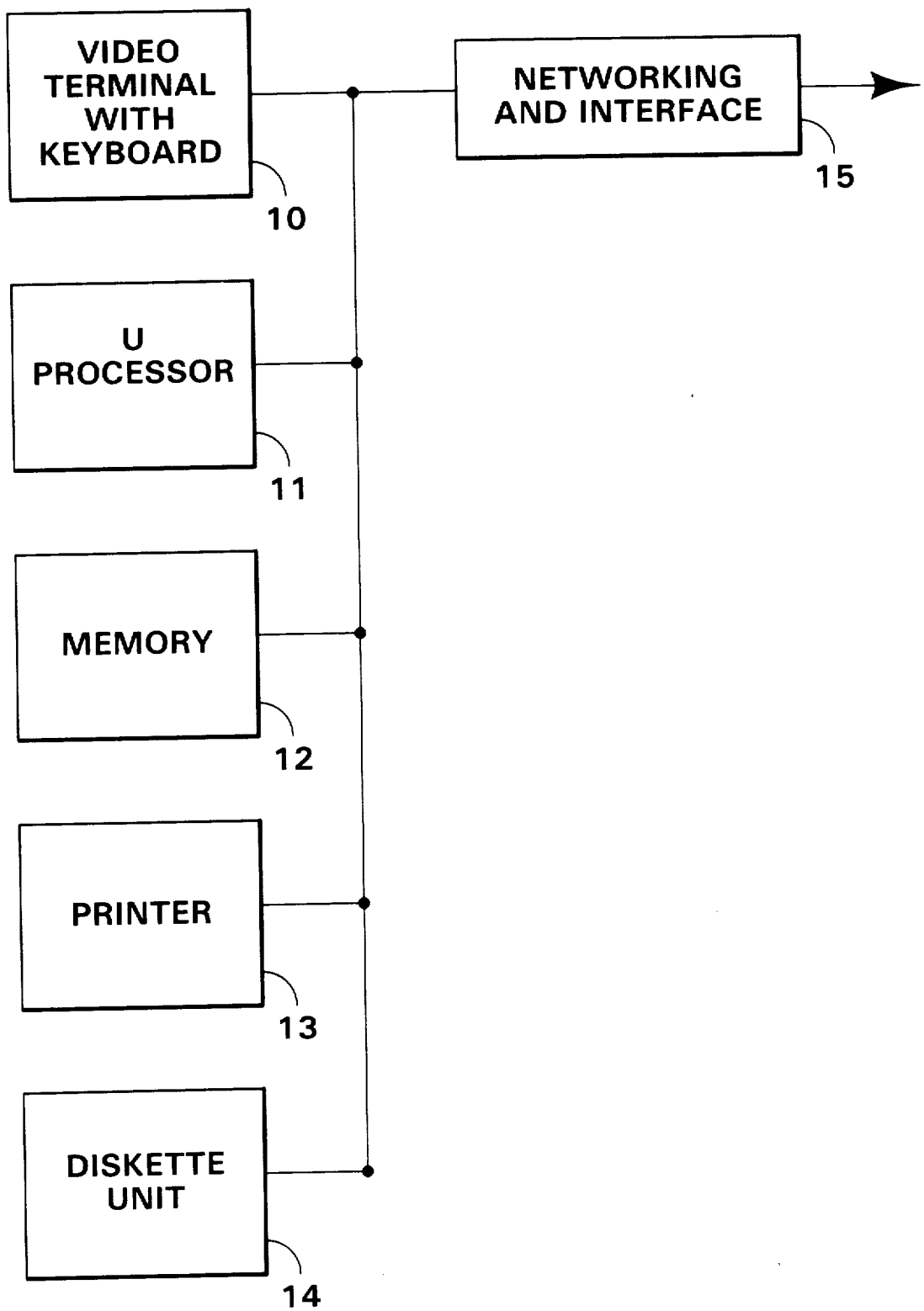
FIG. 1 is a block diagram of an electronic office processing system utilizing the present invention.
Figure 11:
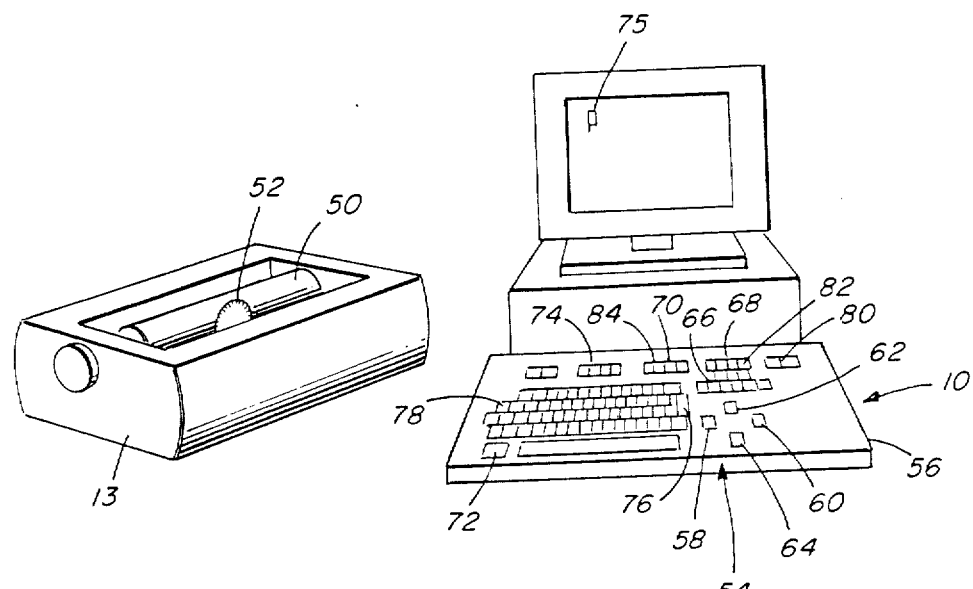
FIG. 11 shows a system diagram of an electronic office processing system utilizing the present invention.

In FIG. 1 is shown a block diagram of an electronic office processing system shown in FIG. 11 incorporating our invention. There is a video terminal including a keyboard 10 with the video terminal being a visual output from the system to the user, and the keyboard being an input by the user to the system. Microprocessor 11 functions under control of operating system software and applications software that are stored in memory 12 in a manner well-known in the art. Memory 12 is also used for storage of information being processed while the electronic office processing system shown in FIG. 1 is in operation. A daisy wheel printer 13 is another output from the system and is used in implementing our novel forms mode of operation, as well as to be used for standard printing operations. Diskette unit 14 is well known in the art and uses standard industry floppy diskettes for storage and retrieval of information. Diskette unit 14 and memory 12 are used with the present invention for the storage of forms templates and information records generated using forms templates in accordance with the teaching of our invention. Networking and communications interface 15 permits connection to other systems via communications networks such as telephone systems, or to other electronic office processing equipment hooked together in a local network arrangement, both in a manner well know in the art. With the local network arrangement hard disk memories (not shown) may be utilized for long-term storage and retrieval of forms templates and information records generated therewith.

The electronic office processing system shown in FIG. 1 may be the type disclosed in detail in U.S. patent application Ser. No. 440,668, entitled Management Communication Terminal System, filed Nov. 10, 1982, now U.S. Pat. No. 4,587,633, in the names of A. Wang, S. Fry, S. Ho, J. Smutek, and assigned to the same assignee as the present invention. The information generated in the form of records created using our novel forms template mode of operation may be stored in a memory using data storage techniques such as taught in U.S. patent application Ser. No. 538,682, entitled Image Storage And Retrieval now U.S. Pat. No. 4,553,206, filed Oct. 3, 1983 in the names of M. Smutek, R. Wenig, N. Webb and A. Waisman, and assigned to the same assignee as the present patent application.

Figure 2:
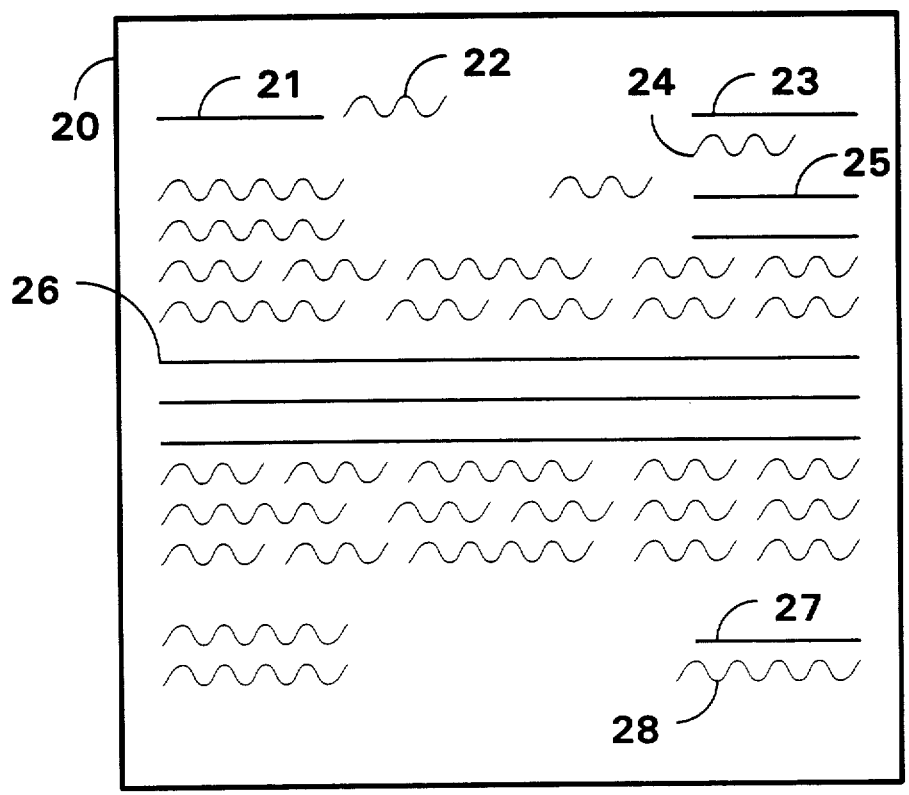

In FIG. 2 is shown a representation of a pre-printed document or form 20 on which is printed alpha numeric material, such as that represented by reference numbers 22, 24 and 28, but on which are also located a number of blank spaces 21, 23, 25, 26 and 27 which are to be filled in to complete the form. Form 20 may also include pictorial or graphic material not shown in FIG. 2.

Figure 3:
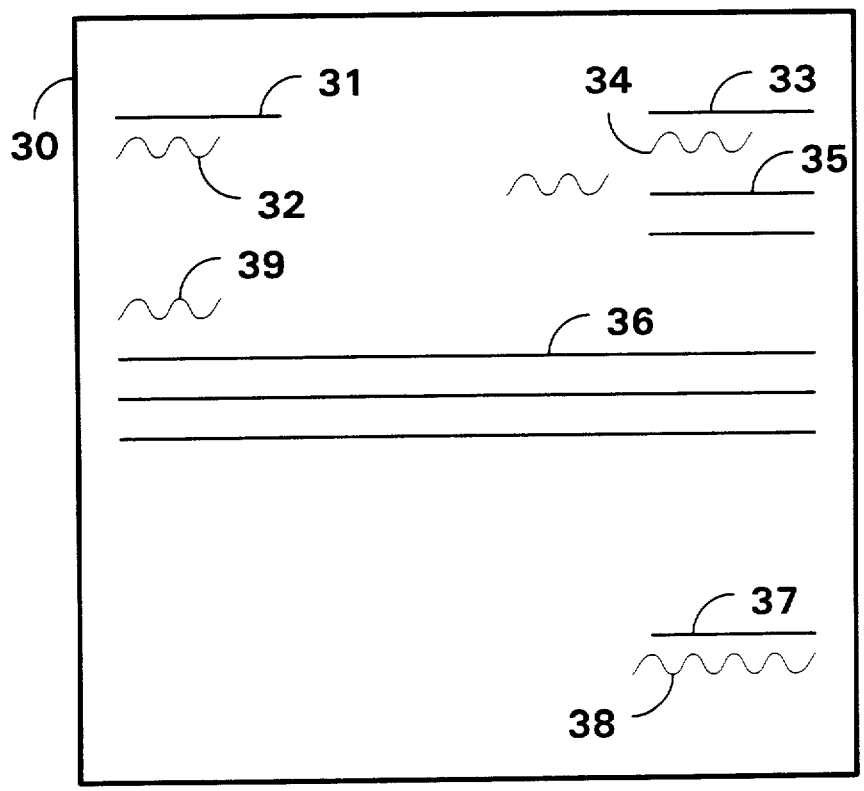
FIG. 3 is a representation of the resulting forms template for the form in FIG. 2 and created using our invention.

FIG. 3 shows a representation of the form template created or the exemplary form represented in FIG. 2 using our invention. The user of the electronic office processing equipment shown in FIG. 1 places form 20 in FIG. 2 into daisy wheel print 13. Daisy wheel printer 13 is well known in the art and has a platen-type roller feed 50 and a moveable daisy wheel print head 52 which moves horizontally along the length of the platen. The print head is moved to print characters on a piece of paper around the platen. Once form 20 is inserted into printer 13 the use of the electronic office processing system selects the Forms Mode of operation in a manner described in detail further in this detailed description. In the Forms mode the user operates the up, down, left and right cursor keys 54 on the keyboard 56 of video display terminal 10 to operate the platen of printer 13 and to move the print head along the platen. As the left cursor key 58 is operated, the print head moves to the left side of the platen, and as the right cursor key 60 is operated the print head is moved to the right end of the platen. As the user operates the up cursor key 62 on the keyboard the platen roller is rotated to move a piece of paper upward, and as the down cursor key 64 is operated the platen roller is rotated to move a piece of paper therein downward. By using the four cursor keys it can be appreciated that the daisy wheel print head may be moved in conjunction with the platen roller to place the daisy wheel print head anywhere on a piece of paper in the platen roller. This direct control is known in the prior art in the Wangwriter marketed by Wang Laboratories, Inc.

In the forms mode, form 20 in FIG. 2 is inserted into the platen roller of daisy wheel printer 13. By operating the four cursor keys on the keyboard the user is first able to place the daisy wheel print head at the upper left corner of document 20 as a reference point and operates the EXECUTE key 66 on the keyboard to provide an indication of same to microprocessor 11. The user repeats this process to place the print head at the left end of blank line 21 on document 20. The user operates the MARK key 68 indicating to microprocessor 11 that this is the left hand end of blank 21. The user then operates the right cursor key to move the daisy wheel print head to the right along the platen roller to the right end of blank line 21. The user again operates the MARK key indicating to the system that the daisy wheel print head is positioned at the right hand end of blank line 21. At the same time the system draws a line 31 on video display 10 as shown in FIG. 3. The user next operates the cursor keys to move the print head to the left hand end of blank line 23 on form 20, operates the MARK key to indicate the beginning of the blank line, then moves the print head to the right hand end of blank line 23 using the cursor keys and again operates the MARK key to indicate the end of the blank line. On video display terminal 10, line 33 is drawn representing blank line 23. This procedure is repeated for each of blank lines 25, 26 and 27 on pre-printed form 20. In FIG. 3 it may be seen that lines 31, 33, 35, 36 and 37 are displayed on video terminal 10 in the same position, and having the same lengths as the corresponding blank lines on pre-printed form 20. The COPY key 70 may be used to repeat whole fields, such as the multiple lines in space 26, 36. If the user doesn't wish to add captions 32, 34, 38 and 39, they operate the SAVE key 72 which indicates to the system that the template entered is completed and is to be saved. The system stores the template in a file having file name assigned by the system user as shown in FIG. 4 and described further in this specification.

In the pre-printed form 20 shown in FIG. 2, there is typically appropriate information printed thereon indicating what information should be entered into each blank. For example, alpha numeric information 22 indicates what information should go in blank line 21, alpha numeric information 24 indicates what information should go in blank line 23, and alpha numeric information 28 indicates what information should go in blank line 27. If the user had wanted to add captions 32, 34, 38 and 39 to the field lines, rather than operate the SAVE key after entering the blank lines 31, 33, 35, 36 and 37 the REF reference key 74 would be operated. The user uses the cursor keys to move the cursor 75 to the beginning position of each caption and then enters each caption 32, 34, 38, and 39. After all captions have been entered the SAVE key is operated and the template with captions (template 30 in FIG. 3) is stored in memory. Such storage will be on a floppy diskette recorded using Diskette Unit 14, or on a hard disk (not shown) via networking interface 15. Form template 30 has all the blank lines that exist on pre-printed form 20 with sufficient descriptive information as captions to indicate what should be entered onto the blank lines. All other pre-printed information on form 20 is not entered into form template 30. The user is not prevented from entering all the alpha-numeric information on pre-printed form 20 into form template 30. However, graphical material may not be entered into Form template 30, but this is not necessary. This operation is described in greater detail herebelow with reference to FIG. 4.

At a later time when it is desired to utilize form template 30 to enter information into the system, the user of the system tells the system via the keyboard and a menu on the display screen that they want the Enter/Change Form Information operation, identifies the form template to be utilized, and the digital representation of the form template is transferred to memory 12 within the processing system. The system then displays the selected form template on the display screen of video terminal 10 and the user enters information therein. This operation is described in greater detail below.

In practical business applications our novel forms mode of operation would be useful in any business in which standard forms are utilized every day. For example, an insurance company claims department receives telephone calls for insurance claims all the time. A claims clerk receiving these calls would use the keyboard 10 to indicate to the system an insurance claim form template to be utilized and then uses the displayed form template to record information pertaining to an insurance claim. Assuming that template 30 in FIG. 3 is the selected claim form template, template 30 would be displayed on the screen of video terminal 10 used by the claims clerk. In response to each telephone claim, the claims clerk would enter basic pertinent information onto blank lines 31, 33, 35, 36 and 37. Upon template 30 being called upon the screen of video terminal 10, the cursor would initially be located at the left end of blank line 31. The clerk knows from caption 32 that the claimant's name is to be entered onto line 31. As the claims clerk types in the name of the claimant, it appears on blank line 31 on the screen of the video display. After entering the claimant's name, the RETURN key 76 followed by the EXECUTE key is operated and the cursor moves to the left end of blank line 33. The claims clerk knows from caption 34 that the data the claim is being made is to be entered onto blank line 33. The claims clerk types in the date which then appears on line 33 and then operates the TAB key. The cursor moves to the left end of blank line 35 and the claims clerk knows from the adjacent caption that the address of the claimant is to be entered onto line 35. Following entry of the claimant's address, the clerk again operates the TAB key and the cursor then moves to the left end of blank line 36. Similarly, blank lines 36 and 37 are filled in with such information as details establishing the claimant's claim and the name of the claims clerk. After all blank lines on forms template 30 are filled in, the operation of the CANCEL key 80 followed by the EXECUTE key indicates to the system that the form is filled in and the entered information is stored.

The above described procedure is repeated many times each day by many claims clerks entering insurance claims, and thereby creates a large data base of claims information.

At a later time, maybe at the end of each day or the following day, it may be desired to generate a filled in pre-printed form. To accomplish this a single form, such a pre-printed form 20, may be placed in daisy wheel printer 13 and the print head positioned at the upper left corner of the form. Due to the movement of the daisy wheel printhead and the platen roller of daisy wheel printer 13 during creation of form template 30, the system is now able to move the printhead and the platen roller to position the printhead at the left end of each of blank lines 21, 23, 25, 26 and 27 in succession. At each of these blank lines, a particular set of stored information (information record), entered using form template 30, is printed on these blank lines to thereby complete the form. As it would be a tedious task to hand feed individual pre-printed forms into daisy wheel printer 13, in actual operation the forms would be fed by an automatic form feeder or would be linked end-to-end with rip-off perforations between the forms. In this manner daisy wheel printer 13 is operated under control of microprocessor 11 in the Forms Print template mode of operation to fill in the blank lines of a multiplicity of forms with the appropriate stored information from the data base of stored information records.

Turning now to FIG. 4, therein is shown a Forms mode menu that appears on the screen of video terminal 10 after this mode of operation is selected from another menu, not shown, that lists many functions such as word processing, typewriter and the forms mode. As may be seen in FIG. 4 the user of the system in the forms mode has five basic operations that may be selected. The user may select Create New Form, Enter Information to select a form for information entry, Print Completed Form wherein the pre-printed forms have their blanks filled in with stored information, Change Information which allows the user to edit already stored information, and a Forms Utilities mode providing miscellaneous functions which are described in detail further in this specification. For any one of these five selections, the user also enters the name of a form, which for entering, printing, changing or utilities is a previously created form name; but for the creation of a new form template requires selecting and entering a new form name. After the appropriate function is selected by using the RETURN key to place the cursor adjacent thereto, the EXECUTE key is operated indicating to the system the function to be performed. The cursor moves to the Please Enter Form Name blank line, the user enters a form name using the keyboard of video terminal 10, and again operates the EXECUTE key. This indicates to the system the form to be worked with. For the Create New Form function the user makes up a form name and enters it into this blank. For the other functions the user enters an existing form name.

When the Enter Information function is selected the system uses the form name entered via the menu of FIG. 4 to locate the particular form template and display it on the display screen of video terminal 10. The user then enters information and stores same as described earlier in this specification.

Turning now to FIG. 5, therein is shown the screen menu displayed after the system user selects Print Completed Form from the menu in FIG. 4. The header of this menu is entitled FORMS PRINTING and has a blank in which the form name is entered. The user usually does not have to enter the form name as they already did so in the screen menu of FIG. 4. The form name is automatically carried forward and displayed in this space to indicate to the user the name of the form that they have selected. The blank line is on the menu of FIG. 5 so that when the user is printing many forms, as may often be the case, they do not have to return to the menu of FIG. 4 every time to do so. They merely initiate a print process for one form and then change the form name in the Form Name line of FIG. 5 by overwriting and deleting in a manner well known in the art, and the reinitiate printing. In this manner the form name entered by the user on the menu of FIG. 4 may also be changed in the event that an error was made or they change their mind. On the display of the menu shown in FIG. 5 the cursor on the display screen initially appears in the blank adjacent to All Forms under the Form Selection column. By operating the RETURN key on the keyboard of video terminal 10, the user moves the cursor sequentially to Select Forms, Front Paper Bin, Rear Paper Bin, Form Name, and finally back to All Forms. The next operation of the Return key returns the cursor to the All Forms blank where the cursor initially appeared.

When All Forms is selected the user operates the EXECUTE key and all information records that have been entered for the particular form template will be printed as previously described. However, in the event that it is not desired to print all information records the user goes to Select Forms and can select particular records of stored information to be printed in the manner previously described. In response to picking Select Forms and operating the EXECUTE key the system uses the name of the form entered on this menu to locate all records stored for this form. All indexes for these records are displayed on the screen of the video display. When a form template is initially created, the user selects a field to be used as an index field. The information entered in the index field is then used to "key" the record for later retrieval. Adjacent to each of these indexes there is a blank to which the display cursor may be moved using the RETURN KEY on the display. The cursor is moved from record entry to record entry, and as the cursor is adjacent to a record that the user wishes to print out, the user operates the INSERT key 82 to leave a marker in the blank adjacent to this record. After all records to be printed have been selected the user operates the EXECUTE key which returns the display to the menu of FIG. 5 where the cursor is adjacent to Front Paper Bin. The user may also use the RETURN key to move the cursor to instead select Rear Paper Bin. Different pre-printed forms may be in these two bins and the user selects the desired form. These two entries are well known in the word processing art and correspond to an automatic paper feeder for a printer. After the user has used the RETURN KEY to position the cursor to select Front Paper Bin or Rear Paper Bin, the subsequent operation of the EXECUTE KEY indicates to the system to commence with printing the appropriate information from stored information records into the blanks of pre-printed forms.

Turning back to FIG. 4, FORMS, the user can select Enter/Change Information to change stored information records. They do this by placing the cursor adjacent to this entry in the menu of FIG. 4 and operating the EXECUTE key. The user enters a forms template name into the blank on the bottom of this menu which will cause the blank form template to be called up on the display screen. The user enters an index name and operates the RETURN key. If the record is found, the completed form is displayed on the screen. The user then uses the RETURN key to move the cursor adjacent to individual fields of information that are to be changed.

Using standard word processing functions such as Insert, Delete or overtyping, the user changes the recorded information in a manner well known in the word processing art. After a record has been corrected the user operates the SEARCH key 84 to return to the index field and reuses the RETURN key to select another record to be edited. This procedure is repeated until all records to be edited have been edited. The user then operates the CANCEL key followed by the EXECUTE key which indicates to the system that all editing changes have been made, and the system changes the stored information records to include the editing changes. Following completion of the changes the system returns the system to display of the menu on FIG. 4 with the cursor at Enter/Change Information.

Figure 10:
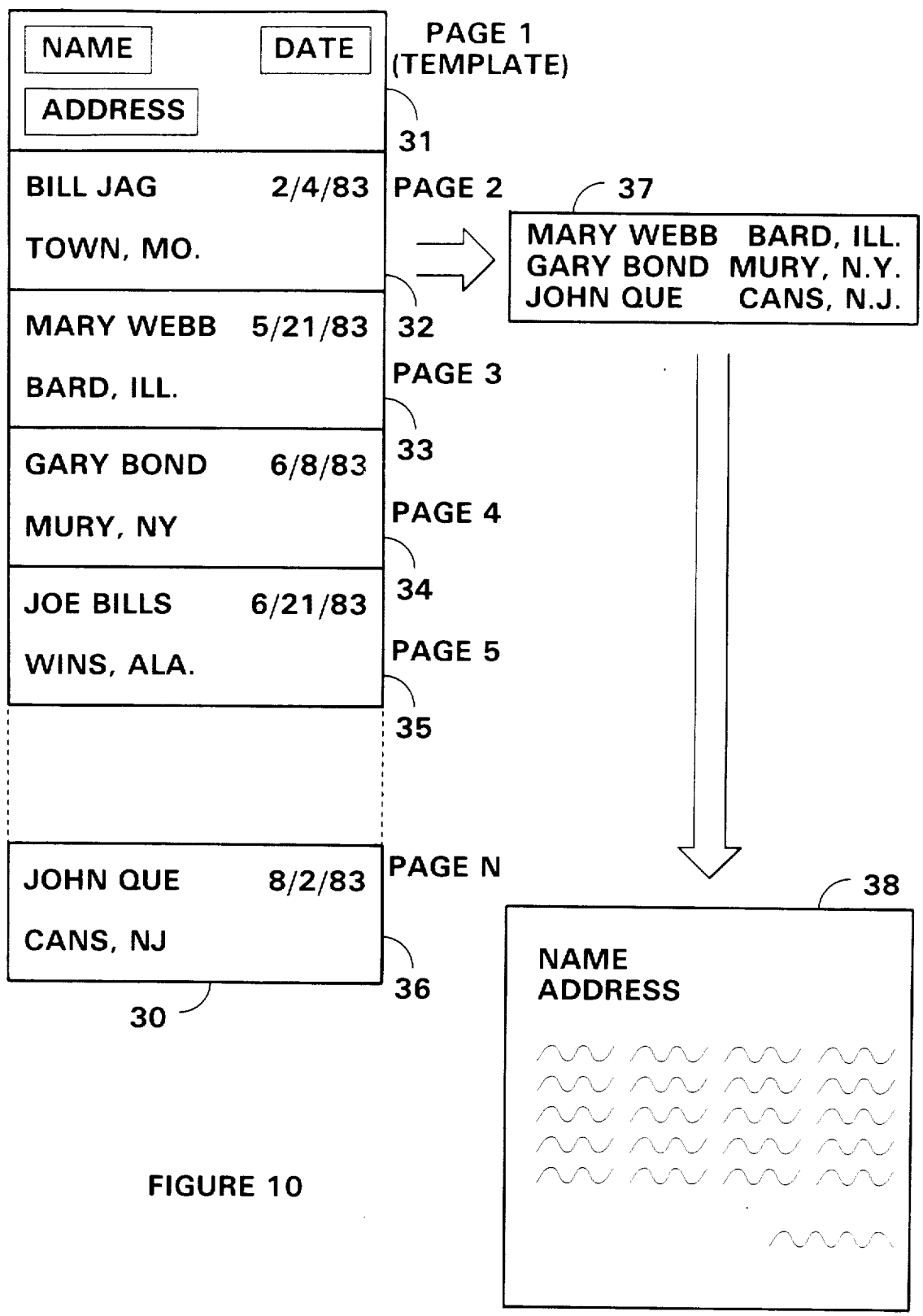
FIG. 10 is a representation of the storage of a form template and information entered and stored using the particular form template, and a selection and condensation of this stored information for subsequent merge type printing on a document different than the pre-printed form from which the form template was made.

The last of the functions that may be selected on the FORMS menu shown in FIG. 4 is Forms Utilities. Upon selection of this function in the same manner as the others were selected, the FORMS UTILITIES menu shown in FIG. 6 is displayed. In this FORMS UTILITIES mode there are three functions which may be selected. The first of these three functions is entitled Create Variable Merge Print Document and is used as described in greater detail hereinafter with reference to FIG. 10. Briefly, this function is used to create merge information records that can be merged into form letters at a later time. This is represented in FIG. 10 as selecting information records for use in preparing a form letter represented as letter 38. Upon selecting Create Variable Merge Print Document in the FORMS menu the next menu to appear on the display screen of video terminal 10 is entitled CREATE VARIABLE MERGE PRINT DOCUMENT and is shown in FIG. 9. The cursor initially appears adjacent to Form Name and the user enters the title of the form template, data from stored information records of which is to be used for merge printing in a form letter as was briefly described above with reference to FIG. 10, and will be described in detail further in this specification. Upon entering the title of the form template, the user operates the RETURN key and the cursor moves to the field entitled Variable Document where the user enters the identity of the document, such as document 38 in FIG. 10, into which selected data from the information records for the identified form template will be entered in creating the merge document. After the identity of the Variable Document is entered and the RETURN key again operated, the cursor moves to the Forms Selection portion of the menu next to the line entitled All Forms. With reference to FIG. 10, if the user wishes to print out say a form letter for each person for which there is an information record for the selected form template, the user operates the EXECUTE key and the system uses some or all the stored information as necessary to fill in the blanks of the merge document 38. In the present example of form letter 38 in FIG. 10, only the name and address information is used, and not the data information. However, if the user only wishes to select specific form template records represented in FIG. 10 as pages 3, 4, and N in block 37, the user first picks Select Form(s) in the menu of FIG. 9 and the tabular list of information indexes for the selected form template appears on the display screen. What appears on the display screen at this time is not exactly as shown by records 30 in FIG. 10, but rather the same information but in a line fashion such as shown in block 37. The user uses the RETURN key to place the cursor adjacent to the desired information records and operates the INSERT key to place a mark thereby. When all information records have been selected for which a form letter will printed the EXECUTE KEY is operated.

Returning to the FORMS UTILITIES menu in FIG. 6, the next field that may be selected by the user using the cursor in the manner already described, is Copy Form Template. This function is used to transfer the stored digital information representing a form template, represented as page 1 in FIG. 10, to a new storage file. That is, when stored form template records are stored on floppy disks a maximum of 75 records typically can be stored on the diskette. It is likely that a number of diskettes may have to be created when they are used to store the information records. This does not happen when a large capacity memory is used. During the course of a day, an insurance claims clerk will be creating a large number of form template records, represented as pages 2 thru N in FIG. 10, and some or all of these records may have to be printed onto the pre-printed forms. Wherever the form information records are stored they have the form template stored with them as represented as page 1 of block 30 in FIG. 10.

When Copy Form Template is selected from the FORMS UTILITIES menu by placing the cursor adjacent thereto with the RETURN key and then operating the EXECUTE key, the COPY FORM TEMPLATE menu shown in FIG. 7 appears on the screen. This menu has two fields therein, and the display cursor initially appears adjacent to Form Name. This indicates to the system a particular form template identity already stored in memory. As there may be more than one floppy diskette used to store records information for a particular forms template, each such diskette must be distinguished from another diskette. To accomplish this, after the user has identified the basic identity of a form template in the field entitled Form Name, the RETURN KEY is operated which moves the cursor on the display screen adjacent to the field entitled New Form Name. In this latter field the user enters a new form name so that one diskette may be distinguished from another diskette. This is relatively simple. For example, if the identity of the forms template entered in the first field entitled Form Name is CLAIMS 1, the user would typically enter CLAIMS 2 in the field entitled New Form Name. For subsequent diskettes in which are stored alike claims information, the user would change the numerical suffix to a 2, 3 and so on so that later diskettes would have a form name such as CLAIMS 18. After the new form name has been entered in New Form Name, the user operates the EXECUTE key which indicates to the system that the user has completed entry of information in these two fields. The system then functions to operate with diskette unit 14 in FIG. 1 to write on a diskette inserted thereon the new form name and a number of form template information records, such as represented by pages 2 thru N in FIG. 10. This process is repeated until a diskette is filled with information and a new diskette must be used to store additional information. At that time, the procedure just described is repeated to create a new diskette.

Returning to the FORMS UTILITIES menu in FIG. 6, the third field therein is entitled Delete Form Information. This field is selected when it is desired to delete information records for a form template. For example, with reference to FIG. 10, if it is desired to delete information record 35, shown as page 5, the Delete Form Information function is utilized. The user places the cursor on the display screen adjacent to Delete Form Information and operates the EXECUTE key to select this function. What appears on the screen is the menu entitled DELETE FORM INFORMATION shown in FIG. 8. There are three fields on this screen menu in which the user is to select information. the cursor initially appears adjacent to the field entitled Form Name. The user enters the identity of the form template, records for which are to be deleted, and then operates the RETURN key. The cursor moves adjacent to the field entry entitled All Forms under Form Selection. This field entry is selected when it is desired to completely erase all record entries for a particular form template. More often than not the user will only desire to delete selected information record entries and will reoperate the RETURN key to move the cursor adjacent to Select Forms. The operator then operates the EXECUTE key. What then appears on the display screen is a list of information indexes stored in the system for the chosen form template in the tabular form generally shown as block 37 in FIG. 10. The user is able to utilize the RETURN key to position the cursor adjacent to particular line information record entries representing entries 32 thru 36. The user moves the cursor adjacent to each information record entry that is to be deleted and operates the INSERT key to place a mark thereby. After such a mark has been placed by each information record that is to be deleted from memory the EXECUTE key is operated, and the microprocessor responds thereto to delete those records from memory. In this manner the user of our novel system is able to edit information record entries and delete those that are no longer of any use.

In FIG. 10 is shown a general representation of stored form template information records. As previously described, with reference to the creation of a form template, a form template is created and appropriate digital information is generated indicating locations, titles and sizes of fields in a form template. This information is stored and used to call the form template up onto the display screen for the entry of information records, and to print previously stored information onto the pre-printed forms. In FIG. 10, the binary information representing a form template is shown as page 1, block 31. The binary information representing a form template and stored information records may be stored in memory 12, shown in FIG. 1, may be stored on conventional floppy diskettes, or may be stored in a larger memory. As previously mentioned, with reference to FIG. 1, diskette unit 14 is part of a system utilizing our invention and would be utilized to store information on floppy diskettes. Wherever information records are stored there must also be stored thereat the binary information representing the associated form template. In FIG. 10, block 30 represents a block of memory, whether a bulk hard disk memory or a floppy diskette, in which is stored the binary information representing a form template and a number of form template records. Area 31 is that portion of memory, of whatever type, in which is stored the binary information representing a form template. Stored thereafter in the memory are a number of information records as pages 2 thru N and shown as areas 32 thru 36 within block 30. In the simple example described herein, the form template only includes NAME, ADDRESS and DATE. As previously described, the user of the system calls up a form template onto the screen of the video display 10 and enters these three types of information. After the information has been entered, it is stored in memory as represented by one of pages 2 thru N. As previously described these form template information records, represented as pages 2 thru N, may be deleted or edited and displayed in tabular form as generally represented in block 37. Block 37 is incomplete in that is represents a selection of form template information records for merge printing. However, it is representative of the fact that the form template information records stored in memory, of whatever form, may be called up onto the display screen of video terminal 10.

While what has been described herein above is a preferred embodiment of our invention, it will be recognized by those skilled in the art that numerous changes may be made without departing from the spirit and scope of our invention. For example, form templates and form template information records may be stored in a remote memory shared by a number of terminals. Or, the menus displayed on the display screen of the video terminal may be varied from that disclosed herein.

What we claim is:

1. A method of operating with pre-printed forms on electronic office processing equipment including a processor, video display, keyboard, memory and printer, and comprising the steps of:
   creating a form template on said video display for a pre-printed form, said template consisting of blank lines of the same length and in the same relative positions to each other as blanks on the pre-printed forms, and having captions adjacent to each blank line indicating the type of information to be entered thereon, the form template being created by positioning a form in the printer and, by means of the keyboard through the processor, controlling relative movement of the form in the printer as the processor monitors the form movement to indicate the locations of blanks in the form;
   storing said form template in said memory of said processing equipment;
   retrieving said form template from said memory and displaying it on said video display when it is desired to enter information for said last mentioned pre-printed form;
   entering appropriate information onto the blank lines on said form template displayed on said video display; and
   storing the information entered onto the blank lines of said form template displayed on said video display.

2. A method of operating with pre-printed forms on electronic office processing equipment including a processor, video display, keyboard, memory and printer, and comprising the steps of:
   creating a form template on said video display for a pre-printed form, said template comprising blank lines of the same length and in the same relative positions to each other as blanks on the pre-printed forms, and having captions adjacent to each blank line indicating the type of information to be entered thereon,
      the form template being created by positioning a form in the printer and, by means of the keyboard through the processor, controlling relative movement of the form in the printer as the processor monitors the form movement to identify the position and length of each blank on said pre-printed form to said processor;
      storing the data representing the position and length of each blank on said pre-printed form;
   displaying said blanks as blank lines on said video display using said stored data, wherein each said line is of the same length and in the same physical positions to each other as said blanks on said pre-printed form; and
   editing the last mentioned display on said video display to add captions adjacent to each blank line indicating the type of information to be entered onto the line, said lines and said captions creating said form template;
   retrieving said form template from said memory and displaying it on said video display when it is desired to enter information for said last mentioned pre-printed form;
   entering appropriate information onto the blank lines on said form template displayed on said video display; and
   storing the information entered onto the blank lines of said form template displayed on said video display.

3. A method of operating with pre-printed forms on electronic office processing equipment including a processor, video display, keyboard, memory and printer, and comprising the steps of:
   creating a form template on said video display for a pre-printed form, said template comprising blank lines of the same length and in the same relative positions to each other as blanks on the pre-printed forms, and having captions adjacent to each blank line indicating the type of information to be entered thereon, the form template being created by positioning a form in the printer and, by means of the keyboard through the processor, controlling relative movement of the form in the printer as the processor monitors the form movement to indicate the locations of blanks in the form;
   storing said form template in said memory of said processing equipment;
   retrieving said form template from said memory and displaying it on said video display when it is desired to enter information for said last mentioned pre-printed form;
   entering appropriate information onto the blank lines on said form template displayed on said video display; and
   storing the information entered onto the blank lines of said form template displayed on said video display;
   wherein the information entered onto said form template creates an information record and many information records are created using said form template, the method further comprising the steps of:
   feeding ones of said pre-printed forms into said printer;
   selecting one or more of the stored information records entered via said form template to be printed onto said pre-printed forms;
   controlling said printer using said selected information records to print the information in the blanks on ones of said pre-printed forms.

4. The method in accordance with claim 3 further comprising of the steps of:
   listing all said stored information records entered at different times using said form template;
   selecting from said list ones of said last mentioned information records to be printed into the blanks of ones of said pre-printed forms using said printer; and printing each selected information record in the blanks of one of said pre-printed forms.

5. The method in accordance with claim 4 further comprising the steps of:
lising all said stored information records entered using said form template;
selecting ones of said stored information records to be deleted from storage in said memory; and
deleting said last mentioned selected ones of said stored information records from said memory.

6. The method in accordance with claim 5 further comprising the step of:
modifying selected ones of said stored information records entered using said form template.

7. The method in accordance with claim 6 further comprising the steps of:
selecting a form document having blanks thereon to be filled in to complete the form document; and
merge print appropriate information from said stored information records with said form document to complete same.

8. The method in accordance with claim 2 wherein the information entered into said form template creates an information record and many information records are created using said form template, and further comprising the steps of:
feeding ones of said pre-printed forms into said printer;
selecting one or more of the stored information records entered via said form template to be printed onto said pre-printed forms; and
controlling said printer using said selected information records to print the information in the blanks on ones of said pre-printed forms.

9. The method in accordance with claim 8 further comprising of the steps of:
listing all said stored information records entered at different times using said form template;
selecting from said list ones of said last mentioned information records to be printed into the blanks of ones of said pre-printed forms using said printer; and
printing each selected information record in the blanks of one of said pre-printed forms.

10. The method in accordance with claim 9 further comprising the steps of:
listing all said stored information records entered using said form template;
selecting ones of said stored information records to be deleted from storage in said memory; and
deleting said last mentioned selected ones of said stored information records from said memory.

11. The method in accordance with claim 10 further comprising the steps of:
modifying selected ones of said stored information records entered using said form template.

12. The method in accordance with claim 11 further comprising the steps of:
selecting a form document having blanks thereon to be filled in to complete the document; and
merge print appropriate information from said stored information records with said form document to complete same.

13. Apparatus for creating and storing a template for a pre-printed form having blanks thereon in which information is to be entered, and the template is used for storing and later printing out said information entered into said blanks on the form comprising:
a microprocessor;
a keyboard functioning with said microprocessor;
a printer having a rotatable platen and a movable print head, both of which are responsive to said microprocessor and to said keyboard to place the print head first at a corner of the pre-printed form, then at the beginning and the end of each blank space on said pre-printed form in which information is to be entered, to identify to said microprocessor the location of each blank space; and
a video terminal;
said microprocessor being programmed to respond to inputs to said keyboard to display on the video terminal lines of the same length and in the same positions to each other as the blanks on said pre-printed form as the print head is placed adjacent to blanks on the form and to respond to inputs to said keyboard to cause captions to be placed adjacent to said lines, said captions indicating the type of information to be entered on the lines, and said lines and said captions making up said form template.

14. The invention in accordance with claim 13 further comprising,
a memory in which said form template is stored after creation, and said form template is read out of said memory and displayed on said video terminal under control of said keyboard and said microprocessor, said keyboard being used to enter information into said form template and to indicate to said processor to store said information entered on said template form; and
a cursor on said video display responsive to said keyboard and said processor to be moved to the blank lines on said form template displayed thereon, to enter information on said blank lines of said displayed forms template and to indicate to said microprocessor when all information has been entered so that the information may be stored.

15. The invention in accordance with claim 14 wherein to print said stored information time said pre-printed form is placed in said printer and its platen and print head are moved to each blank space on the form under control of the microprocessor using the form template blank line location information, and the appropriate stored information is printed on the blank lines of the pre-printed form.

* * * * *